United States Patent
Grundhofer

(10) Patent No.: US 10,080,004 B2
(45) Date of Patent: Sep. 18, 2018

(54) METHOD AND SYSTEM FOR PROJECTOR CALIBRATION

(71) Applicant: Disney Enterprises, Inc., Burbank, CA (US)

(72) Inventor: Anselm Grundhofer, Greifensee (CH)

(73) Assignee: Disney Enterprises, Inc., Burbank, CA (US)

(*) Notice: Subject to any disclaimer, the term of this patent is extended or adjusted under 35 U.S.C. 154(b) by 158 days.

(21) Appl. No.: 14/534,855

(22) Filed: Nov. 6, 2014

(65) Prior Publication Data

US 2016/0134851 A1    May 12, 2016

(51) Int. Cl.
    *H04N 9/31*     (2006.01)
    *G06T 3/00*     (2006.01)
    *G01B 11/25*     (2006.01)

(52) U.S. Cl.
    CPC ....... *H04N 9/3185* (2013.01); *G01B 11/2504* (2013.01); *G01B 11/2513* (2013.01); *G06T 3/0093* (2013.01); *H04N 9/3194* (2013.01)

(58) Field of Classification Search
    CPC ...... H04N 9/3185; H04N 9/31–9/3197; G01B 11/2504; G01B 11/2513; G06T 3/0093
    See application file for complete search history.

(56) References Cited

U.S. PATENT DOCUMENTS

| | | | |
|---|---|---|---|
| 5,204,944 A * | 4/1993 | Wolberg | G06T 3/0093 345/419 |
| 8,766,998 B1 | 6/2014 | Morgan, III et al. | |
| 2001/0017687 A1 * | 8/2001 | Rodriguez, Jr. | H04N 5/74 353/70 |
| 2004/0141156 A1 * | 7/2004 | Beardsley | G06K 9/2036 353/69 |
| 2004/0184013 A1 | 9/2004 | Raskar et al. | |

(Continued)

FOREIGN PATENT DOCUMENTS

CN     1698358 A     11/2005
CN     101594404 A     12/2009

(Continued)

OTHER PUBLICATIONS

Mahdy, Yousef B. et al., "Projector Calibration Using Passive Stereo and Triangulation", International Journal of Future Computer and Communication, vol. 2, No. 5, Oct. 2013, pp. 1-6.

(Continued)

*Primary Examiner* — Christina Riddle
*Assistant Examiner* — Christopher Lamb, II
(74) *Attorney, Agent, or Firm* — Dorsey & Whitney LLP

(57) ABSTRACT

The present disclosure relates to a method for calibrating a projector. The method includes projecting a test pattern onto a scene or an object within the scene and capturing the test pattern using a camera. Once the test pattern image has been captured by the camera, the method further includes estimating by a processing element a perspective projection matrix, warping the estimated projection matrix based on a non-linear distortion function, and modifying the projector to project light based on the distortion function. The present disclosure also relates to a presentation or projection system including two types of projectors for projecting an output presentation having a second image overlaid on a first image.

9 Claims, 10 Drawing Sheets

(56) References Cited

U.S. PATENT DOCUMENTS

| | | | | |
|---|---|---|---|---|
| 2006/0001839 A1* | 1/2006 | Beardsley | ............... | G03B 21/26 |
| | | | | 353/69 |
| 2006/0209268 A1* | 9/2006 | Raskar | ..................... | H04N 5/74 |
| | | | | 353/69 |
| 2007/0273795 A1* | 11/2007 | Jaynes | ................. | H04N 9/3147 |
| | | | | 348/745 |
| 2008/0062164 A1* | 3/2008 | Bassi | ................... | H04N 9/3147 |
| | | | | 345/214 |
| 2008/0246781 A1* | 10/2008 | Surati | ..................... | H04N 5/74 |
| | | | | 345/690 |
| 2010/0283874 A1* | 11/2010 | Kinrot | .................... | G06T 5/003 |
| | | | | 348/242 |
| 2010/0318319 A1* | 12/2010 | Maierhofer | ............ | G01B 11/03 |
| | | | | 702/150 |
| 2012/0120372 A1* | 5/2012 | Timoner | ................. | G06T 5/006 |
| | | | | 353/31 |
| 2013/0229396 A1* | 9/2013 | Huebner | .............. | H04N 9/3147 |
| | | | | 345/207 |
| 2013/0342816 A1* | 12/2013 | Furui | ................... | G03B 21/147 |
| | | | | 353/69 |

FOREIGN PATENT DOCUMENTS

| | | |
|---|---|---|
| CN | 103026381 A | 4/2013 |
| CN | 104052951 A | 9/2014 |
| WO | 2014/084148 A1 | 6/2014 |

OTHER PUBLICATIONS

Partial European Search Report for Application No. 15189908.5 dated May 4, 2016, pp. 1-10.

* cited by examiner

METHOD AND SYSTEM FOR PROJECTOR CALIBRATION

TECHNICAL FIELD

The technology described herein relates generally to methods and systems for calibrating one or more projectors.

BACKGROUND

Image projectors may be used to project images onto a projection surface, such as a screen or other surface. In some applications, video projectors may be used to enhance, compliment, or otherwise augment objects on the surface to create a dynamic and enjoyable user experience, such as, for example, an amusement park attraction. For example, characters or objects may be projected on a surface that virtually "interact" with real objects on the surface.

Conventional video projectors have a number of limitations. In particular, conventional video projectors have limited color gamut and brightness. Due to these limitations, presentations using only conventional video projectors can appear dull and flat. Further, in situations where ambient lighting is present, the resulting image can appear washed out and unrealistic. On the contrary, laser projectors, such as laser scanning projectors, have increased brightness and color gamut as compared to conventional video projectors. In particular, laser projectors can project pure saturated, i.e. monochromatic red, green, and blue color tones, allowing a significantly wider color gamut than conventional video projectors.

However, known calibration techniques for laser projectors require significant user interaction, are time-intensive, and are often not very accurate. As such, there is a need for a technique that can be used to more accurately and automatically calibrate laser projectors.

The information included in this Background section of the specification, including any references cited herein and any description or discussion thereof, is included for technical reference purposes only and is not to be regarded subject matter by which the scope of the invention as defined in the claims is to be bound.

SUMMARY

One example of the present disclosure is related to a method of calibrating a projector with non-uniform distortion characteristics. The method includes receiving by a processing element a first calibration image of a calibration pattern projected onto a projection surface, generating a perspective projection matrix by the processing element by analyzing the first calibration image and the calibration pattern, and determining by the processing element a non-linear mapping function by analyzing the first calibration image.

Another example of the present disclosure includes a system for calibration of a projector, such as a laser projector or other projector with non-uniform distortion characteristics. The system includes a projector that projects a first calibration pattern onto a projection surface, a camera that captures a first calibration image of the first calibration pattern projected onto the projection surface and a computing device in communication with the camera. The computing device generates a perspective projection matrix based on the first calibration image and determines a distortion map for the projector by analyzing the first calibration image and the first calibration pattern, the distortion map determines the non-linear distortion present within the projector, which are not approximated accurately by the perspective projection matrix Yet another example of the present disclosure includes a projection system having a video projector and a laser projector calibrated by using a non-linear mapping technique. Using the system, the video projector projects a first image onto a projection surface and the laser projector projects a second image onto the projection surface. The second image overlays the first image on the projection surface and provides an augmentation and/or accent for at least one portion of the first image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

SPECIFICATION

Overview

Figure 1:
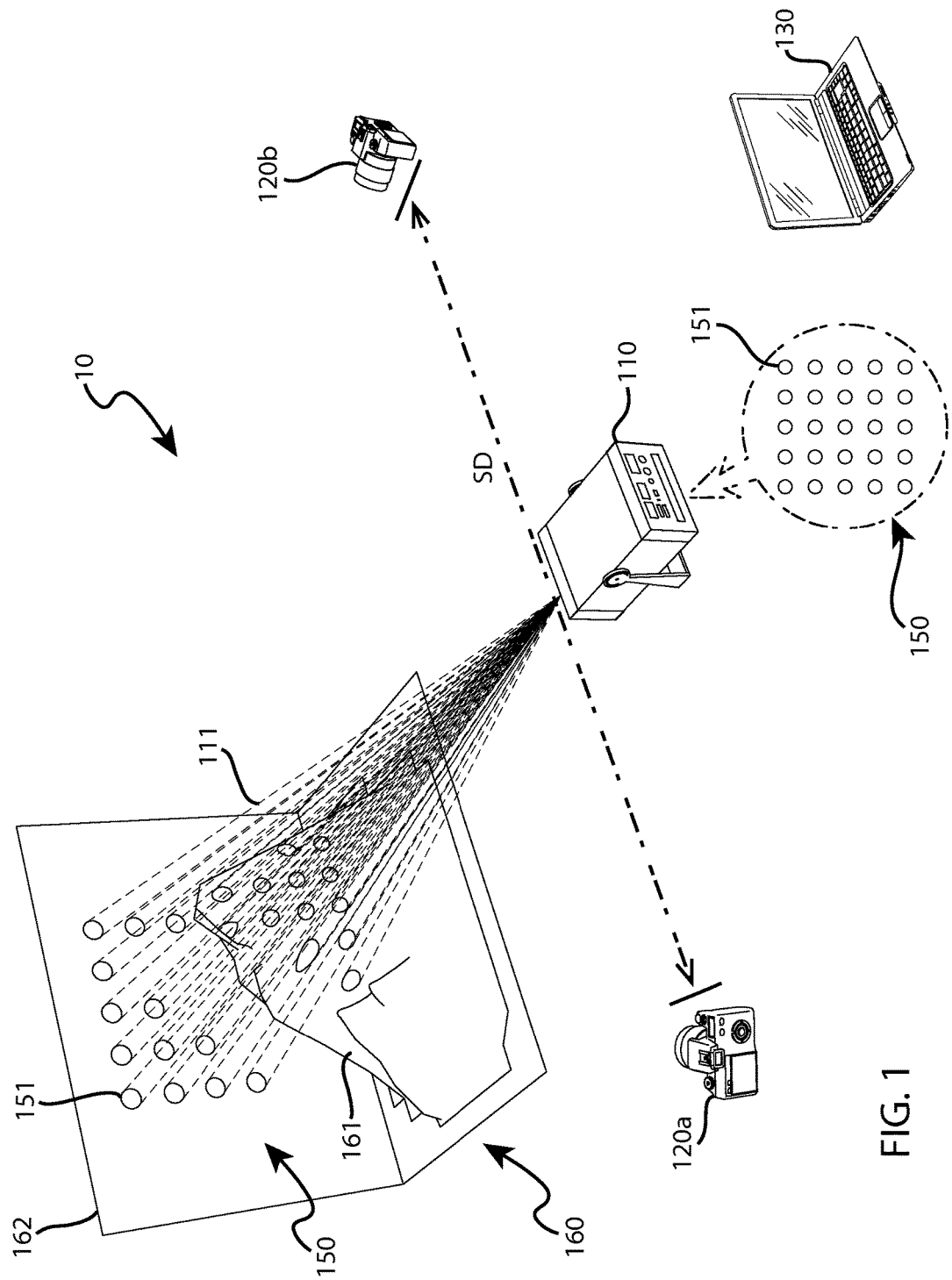
FIG. 1 is an isometric view of the projection calibration system of the present disclosure.

The present disclosure is generally related to calibrating a projector that exhibits non-uniform distortion characteristics, such as a laser projector, projector with a fish eye lens, ellipsoid, or other varying shaped lens. The method also relates to using the calibrated projector, in one example, a laser projector in one or more presentations, either alone or in combination with one or more laser or other types of projectors. The embodiments disclosed herein are generally applicable to any type of projector, including those with traditional lens projection systems. However, as detailed below, the calibration method may be particularly useful when used with a projector or projector system having an optical assembly with atypical, non-uniform, or unexpected distortion properties. The term "laser projector" as used herein is meant to refer to substantially any type of coherent light projecting component, such as, but not limited to, a galvanoscopic laser scanning projector. The term "projector with non-uniform distortion characteristics" may refer to a projector having projection optics with extreme and/or non-uniform distortion such as projectors having a poor-quality lens optics, laser projectors, projection systems having mirrors in the optical path, or a projector which uses fisheye or other wide field-of-view projection lens (e.g., an image MAXium (IMAX) projector). It is noted that when the calibration techniques as described herein are used with conventional lens-based projectors, some steps may not be necessary in order to accurately calibrate the projector or projection system. The term "video projector" as used herein is meant to refer to substantially any type of lens based two dimensional raster projecting component, such as a digital light processing projector, a liquid crystal display projector, or the like.

The calibration method includes creating a calibration pattern, projecting one or more calibration patterns onto a projection surface, capturing at least one calibration image of the calibration pattern(s) with one or more cameras, and using the captured calibration images to create a distortion map that translates an input image to an output image. In some embodiments, two or more calibration patterns may be projected and two or more calibration images may be captured.

The calibration or test pattern used for the calibration method may be substantially any type of structured light pattern including an array of elements such as dots, lines, line segments, shapes, hue variations, or other types of patterns, which may be random or ordered, repeating or non-repeating. In some examples, the calibration pattern may represent a binary encoded sequence, where each element within the pattern, e.g., dot, line, etc., may be uniquely identifiable. In some embodiments, a plurality of calibration patterns may be projected individually in a sequence, which provides additional data points to be detected from each pattern. As will be discussed below, this allows each element of the calibration pattern to be used to determine the physical location of respective elements of the calibration pattern on the projection surface.

Once the calibration pattern has been created or selected, the calibration pattern is provided to the projector to be projected onto a projection surface. The projection surface may be a screen, an object, and/or substantially any type of surface. As the calibration pattern is being projected, two or more cameras, or a single three-dimensional camera, capture calibration images of the calibration pattern on the projection surface. In some embodiments, the laser projector projects the calibration pattern at specific or known two-dimensional (2D) locations on a virtual image plane of the laser projector. For example, the known 2D locations may be the original input coordinates used to project the light from the laser projector. Additionally, a described above, two or more calibration patterns may be projected in a predetermined sequence and images of each calibration pattern as it is projected may be captured.

Using a processor or other computing element, the captured calibration images and the known 2D locations can be used to determine the 2D coordinates of the test pattern elements for the laser projector. Then, the processor analyzes the identifiers for the test pattern elements of the calibration pattern to determine the three-dimensional (3D) projection position of each element on the projection surface. For example, the processor may triangulate the 3D projection position for each element based on the element position within the projected calibration image and the known camera locations and orientations. However, other methods of determining 3D location of the test pattern elements may be used, such as using a 3D stereoscopic camera or other imaging device capable of depth measurement, in these instances only a single camera may be required, whereas two cameras may be required to triangulate the projection positions.

Once the actual 3D position of the pattern elements has been determined, a perspective projection matrix may be created. For example, a processor may create a perspective projection matrix by assuming the projection characteristics of the laser projector are represented by a pinhole approximation for a pinhole device. That is, the processor may assume that the laser projector has similar projection characteristics as a conventional projector having an optical lens system. The perspective projection matrix created in this manner is typically not as accurate as desired because a laser scanning projector does not behave as a pinhole device due to the use of a mirror assembly rather than a lens assembly and thus does not resemble a perfect pinhole device. Thus, the perspective projection matrix does not accurately represent the positions of the pattern elements.

To improve the accuracy, an additional non-linear 2D mapping may be performed after the application of the estimated perspective projection matrix to more accurately match the transformation of the 3D positions of each pattern element. In one embodiment, an interpolation method is utilized to create a dense look up table for points between each detected pattern element. Accordingly, distortion exhibited by the laser projector at points on its virtual image plane can be taken into account and quantified, allowing calibration of the laser projector. That is, an input image may be translated or modified using the matrix transformation in combination with the additional non-linear 2D mapping to provide an output image, where the output image will be projected so that each pixel is projected onto a desired position on the projection surface.

Because the laser projector can be accurately calibrated allowing the input image to be projected at desired locations, the laser projector can be used for presentations that require highly accurate projection. For example, the laser projector may be used to project an accent image on top or on the same location as a video projector's image. In this example, the laser projector can be calibrated so that a particular element of the projected input image will match a corresponding or complimentary image content projected by the video projector. As another example, the laser projector may be used to project images onto a 3D object or surface and each point of the image may be displayed on the desired location.

In one embodiment, a system including the calibrated laser projector and one or more video projectors may be used together to provide a presentation, output, entertainment feature, amusement park attraction, or the like. In particular, the enhanced brightness and color saturation of the laser projector may be used to display high frequency features, accent details, or otherwise augment the video projector presentation onto one or more projection surfaces. As an example, if an object projected by the conventional video projector should have a sparkling or glistening quality, such a snowy scene or sparkling diamond, the laser projector may be used to project much brighter image features overlaid with the projected video object. In this example, the laser-projected features can enhance the image data creating a "sparkle," or other bright output, resulting in a more realistic and entertaining presentation for the user, such as an amusement park guest. Due to the calibration, the image projected by the video projector and the image projected by the laser projection may be substantially aligned to create the desired artistic effect.

In some embodiments, the system may display the desired image content from the projectors, along with any other visual or audio effects that may accompany or be synchronized to the presentation, such as additional scene lighting, special effects sounds, and/or character dialog.

DETAILED DESCRIPTION

Figure 2:
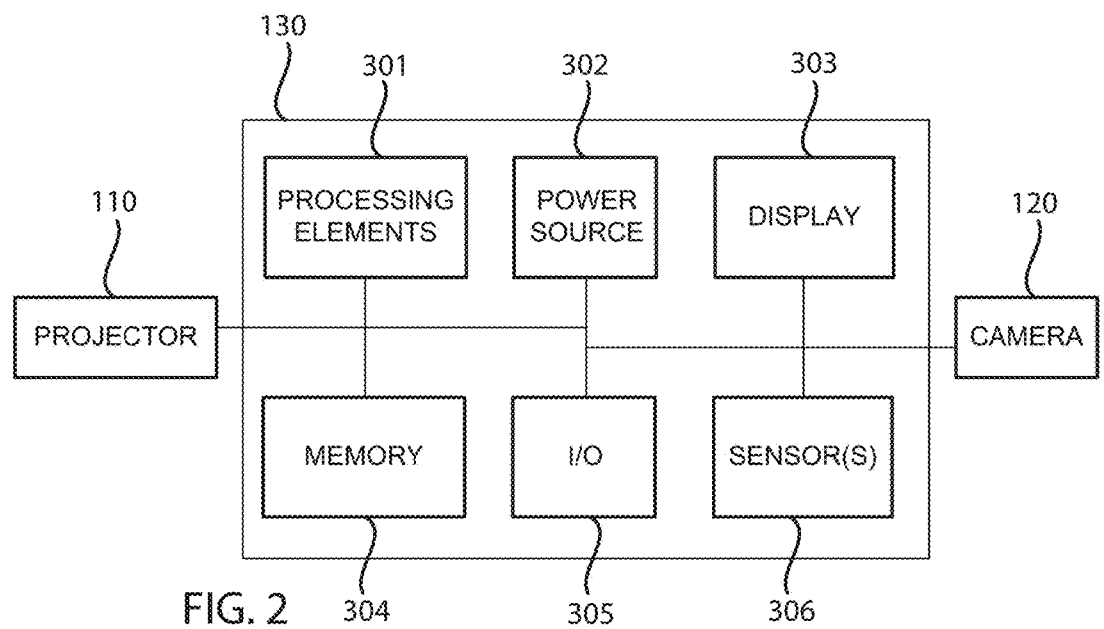
FIG. 2 is a block diagram of the calibration system of FIG. 1.

Turning now to the drawings, the calibration method and system of the present disclosure will now be discussed in more detail. FIG. 1 is a perspective view of a calibration system 10. FIG. 2 is a simplified block diagram of the calibration system 10. With reference to FIGS. 1 and 2, the calibration system 10 may include one or more laser projectors 110, a projection surface 161, one or more cameras 120a, 120b, and one or more computers 130. The one or more laser projectors 110, cameras 120a, 120b, and computers 130 may all be in electrical communication with one another and/or include the ability to share and transport information between each device. Each of the components will be discussed in turn below.

The projection surface 161 may be substantially any type of opaque surface or object. For example, the projection surface 161 may be flat, non-planar or varying and may include one or more textures or surface variations, and/or colors. In some instances, the projection surface 161 may include multiple surfaces at different depths or locations relative to one another. The type and structure of the projection surface 161 may be varied as desired.

The cameras 120a and 120b may be substantially any device capable of capturing still or video images, e.g., a charge-coupled device camera or complimentary metal-oxide-semiconductor (CMOS) image sensor camera. The cameras 120a, 120b, collectively referred to as a camera system 120, may be able to capture full color images and/or monochromatic images, and may use any type of filter such as one or more color filters. In one embodiment, the cameras 120a, 120b are configured to capture substantially the entire dynamic range of the laser projector 110 without severe clipping. Each camera 120a, 120b is registered or otherwise placed in a known position with their environment, such that the specific orientation and location of each camera 120a, 120b relative to the projection surface 161.

In some embodiments, two or more cameras 120a, 120b are used. In these embodiments, the cameras 120a and 120b are physically offset from one another at a predetermined separation distance $S_D$, i.e., a known separation distance. In addition to the separation distance $S_D$, the orientation of the cameras 120a, 120b relative to each other may also be known or predetermined. For example, the orientation of the cameras 120a, 120b may be determined manually or with standard methods. It is noted that while two cameras 120a, 120b are shown, in other embodiments, more than two cameras may be used, or two cameras 120a, 120b may be replaced by a single camera, such as a 3D camera, stereoscopic, or depth-sensing camera system.

With continued reference to FIGS. 1 and 2, the calibration system 10 also includes the computer 130. The computer 130 analyzes data from both the projectors 110 and the cameras 120, and also may optionally control one or more functions of either device. In the example of FIG. 1, only one computer 130 is shown; however, in other embodiments, more than one computer may be used. The computer 130 may include one or more processing elements 301, a power source 302, a display 303, one or more memory components 304, and an input/output (I/O) interface 305. Each of the elements of the computer 130 may be in communication via one or more system buses, wirelessly, or the like.

The processing element 301 may be substantially any type of electronic device capable of processing, receiving, and/or transmitting instructions. For example, the processing element 301 may be a microprocessor or microcontroller. Additionally, it should be noted that select components of the computer 130 may be controlled by a first processor and other components may be controlled by a second processor, where the first and second processors may or may not be in communication with each other.

The memory 304 stores electronic data that is used by the computer 130 to store instructions for the processing element 301, as well as store presentation and/or calibration data for the calibration system 10. For example, the memory 304 may store data or content, such as, but not limited to, audio files, video files, and so on, corresponding to various applications. The memory 304 may be, for example, magneto-optical storage, read only memory, random access memory, erasable programmable memory, flash memory, or a combination of one or more types of memory components.

A power source 302 provides power to the components of the computer 130 and may be a battery, power cord, or other element configured to transmit power to the components of the laser projector 110.

The display 303 provides visual feedback to a user and, optionally, can act as an input element to enable a user to control, manipulate, and calibrate various components of the calibration system 10. The display 303 may be any suitable display, such as a liquid crystal display, plasma display, organic light emitting diode display, and/or cathode ray tube display. In embodiments where the display 303 is used as an input, the display may include one or more touch or input sensors, such as capacitive touch sensors, resistive grid, or the like.

The I/O interface 305 provides communication to and from the laser projector 110, cameras 120, and the computer 130, as well as other devices (e.g., other computers, auxiliary scene lighting, speakers, etc.). The I/O interface 305 can include one or more input buttons, a communication interface, such as WiFi, Ethernet, or the like, as well as other communication components, such as universal serial bus (USB) cables, or the like.

Optionally, the computer 130 may have sensors 306. The sensors 306 include substantially any device capable of sensing a change in a characteristic or parameter and producing an electrical signal. The sensors 306 may be used in conjunction with, or in place of, the cameras 120a, 120b, or may be used to sense other parameters such as ambient lighting surrounding the projection surface 161. The sensors 306 and display 303 of the computer 130 can be varied as desired to meet the needs of a particular application.

Figure 3:
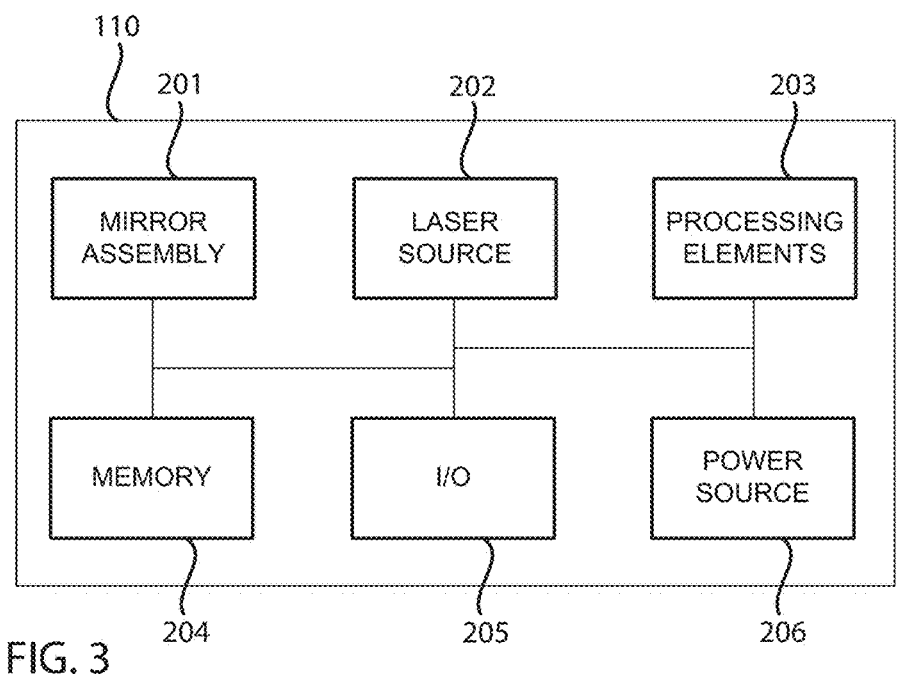
FIG. 3 is a block diagram of the laser projector 110 of the system in FIG. 1.

The laser projector 110 of the calibration system 10 will now be discussed in more detail. FIG. 3 is a simplified block diagram of the laser projector 110. With reference to FIGS. 1 and 3, the laser projector 110 is used to project light patterns, images, or the like onto the projection surface 161 of the scene 160. The laser projector 110 may be substantially any type of coherent light and/or non-lens based projection component. It should be noted that although the embodiments discussed herein are discussed with respect to a laser projector, the calibration methods and system may be used with substantially any type of projector that exhibits non-uniform distortion characteristics, such as, for example, fish eye lens projectors, ellipsoid projectors, or the like, and as such, the discussion of any particular embodiment is meant as illustrative only.

In some embodiments, the laser projector 110 may project red, green, and/or blue coherent light. In other embodiments the laser projector 110 may project substantially any other color or frequency of light, including visible or invisible light (e.g. ultraviolet, infrared, and others), as necessary. The laser projector 110 may be a galvanometric scanning laser projector, or the like. The laser projector 110 may include a mirror assembly 201, a laser source 202, one or more processing elements 203, one or more memory components 204, an I/O interface 205, and a power source 206. In some embodiments, the computer 130 may provide some of or all of the processing and storage functions for the projector 110, and, in these embodiments, one or more features of the projector 110 may be omitted.

The mirror assembly 201 directs light emitted by the laser source 202 onto the projection surface 161. In some embodiments, the mirror assembly 201 may include two or more mirrors connected to galvanometers, servos, or other motion inducing elements. In one embodiment, the mirrors of the mirror assembly 201 may be oriented orthogonally relative to one another, such that one mirror rotates around a first axis and the other mirror rotates around a second axis orthogonal to the first axis. The motion inducing elements move the mirrors, based on an input to the projector 110, to change the output and location of light emitted from the projector 110.

The one or more processing elements 203 receive input image data from memory components 204 or I/O interface 205. The processing element 203 may be substantially similar to the processing element 112, and may be any electronic device capable of processing, receiving, and/or transmitting instructions. For example, the processing elements 203 may be a microprocessor or microcontroller.

The memory 204 stores electronic data that is used by the laser projector 110 and/or computer 130, and may be volatile or non-volatile memory. The memory 204 may be substantially similar to the memory 114, but, in many embodiments, may require less storage than other components.

The power source 206 provides power to the components of the laser projector. The power source 206 may be a battery, power cord, or other element configured to transmit power to the components of the laser projector.

The laser source 202 may be one or more solid state laser sources, such as a laser diode, or may be a gas laser source and/or other types of coherent light.

The I/O interface 205 provides communication to and from the laser projector 110 and the computer 130, as well as other devices. The I/O interface 205 can include one or more input buttons, a communication interface, such as WiFi, Ethernet, or the like, as well as other communication components, such as universal serial bus (USB) cables, or the like.

With reference again to FIG. 1, the calibration system 10 is used to calibrate the laser projector 110. As part of the calibration process, the laser projector 110 projects a calibration pattern 150 onto the scene 160. FIGS. 4A-4I illustrate various examples of the calibration pattern 150. With reference to FIGS. 4A-4I, the calibration pattern 150 is a predefined, structured light arrangement having several pattern elements 151. For example, the calibration pattern 150 may include one or more blobs or regions with substantially constant properties, or properties that are varied, within a prescribed range of values. In some examples, each of the pattern elements 151 or points in the blob may be similar to each other in at least one characteristic. The calibration pattern 150 may be constructed in such a way that the location of each pattern element 151 may provide identifying information. For example, each pattern element 151 may include an identifier associated therewith that can be explicitly displayed and/or implicitly deduced.

In some embodiments, the pattern elements 151 may be an array of laser dots or other shapes. In other embodiments, the pattern elements 151 may be in the shape of a circle, a plus sign, a square, or other suitable geometric shape. Further, the pattern elements 151 may also include localized or structured changes or variations in color, hue, intensity, polarization, or tint, where these characteristics may provide additional data points to be tracked or may form the pattern elements themselves. In one embodiment, the calibration pattern 150 may contain an array of 64×64 laser dots arranged in rows and columns as pattern elements 151. It should be noted that the pattern elements 151 may take on substantially any shape or size as desired. As will be discussed in more detail below, in some embodiments, each of the pattern elements in the pattern 150 may be projected in a temporal binary encoded sequence that uniquely identifies each element 151 by the series of binary on/off occurrences. That said, the calibration pattern 150 may be formed into any structured light pattern shape and layout that allows each element 151 to be detected and extracted, and its position within the pattern can be obtained.

With continued reference to FIGS. 4A-4I, calibration pattern 150 may include a plurality of laser dot test pattern elements 151 arranged in one or more orientations, arrangements, or patterns. In some embodiments, the pattern elements 151 may be uniformly distributed in rows and/or columns, and, in other embodiments, the pattern elements 151 may be distributed in a non-uniform, but structured, manner. For example, with reference to FIG. 4A, the elements 151 are arranged in columns and rows with each element 151 being equidistance to each adjacent element 151. As another example, with reference to FIG. 4B, the elements 151 are separated into two equal sections spaced apart from one another. In this example, the elements 151 within a section are equally spaced relative to others within that section. As shown in FIGS. 4A-4I, other patterns with different characteristics or features for the arrangement of the elements 151 may be used.

The number of pattern elements 151 within the pattern 150 may be varied based on desired accuracy for the calibration. In particular, as the number of elements 151 increase, so may the accuracy. Further, the separation or distance between each element 151 within the pattern 150 may also improve the sensitivity of the calibration, and thus the accuracy. For example, in instances where the projection surface 161 may have a dynamic geometry, the separation between pattern elements may be reduced and/or additional pattern elements 151 may be added. By reducing the separation between respective pattern elements 151, more pattern elements 151 may be projected onto the same surface area of the projection surface 161. In other words, by increasing the number of elements 151 projected onto a particular area, more elements 151 are likely to be positioned on facets of the projection surface 161, which may allow more elements 151 to be detected.

The calibration pattern 150 may be selected based on a variety of characteristics associated with the scene 160, desired calibration accuracy of the projector 110, and so on. As such, the discussion of any particular embodiment is meant to be only illustrative.

Figure 5:
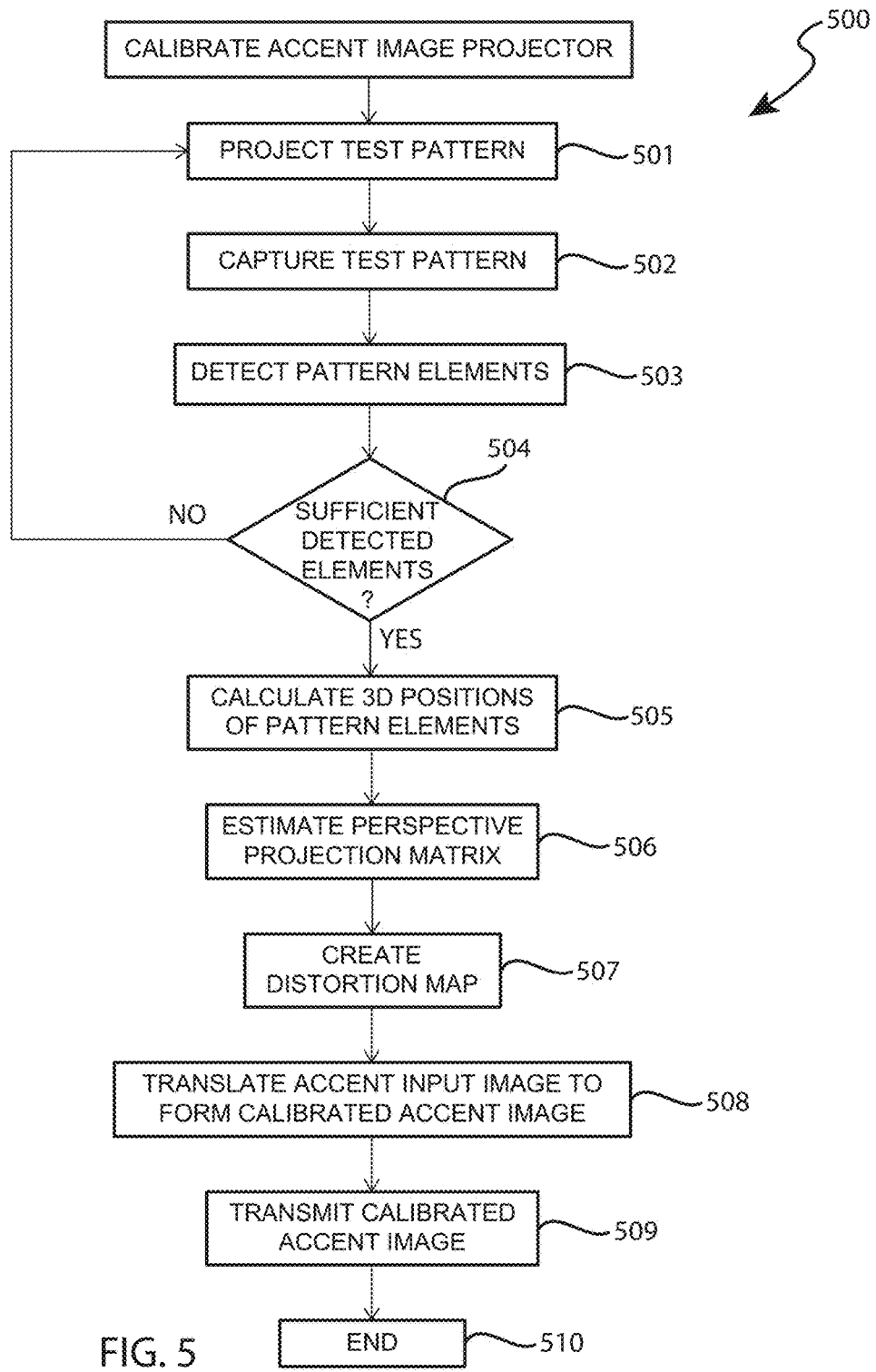
FIG. 5 is a flow chart illustrating the method of calibrating the laser projector.

Operation of the calibration system 10 and methods for calibration of the projector system will now be discussed in more detail. FIG. 5 is a flow chart illustrating a method for calibrating the laser projector 110. With reference to FIG. 5, the method 500 may begin with operation 501. In operation 501, the laser projector 110 projects the calibration pattern 150 onto the projection surface 161. In one embodiment, the pattern elements 151 are projected individually or in groups in a temporal binary encoded sequence. For example, in one embodiment, each element 151 may be identified by the series of on/off occurrences, in other embodiments, the pattern elements 151 may be projected substantially simultaneously.

In some embodiments, portions of a calibration pattern 150 which contain a subset of pattern elements 151 may be projected, whereas remaining portions of the overall calibration pattern 150 having other groups of pattern elements 151 are subsequently projected. In still other embodiments, a calibration pattern 150 having a first set of pattern elements 151 may be projected, followed by another calibration pattern 150 with a second set of pattern elements 151, which may be the same or different than the first calibration pattern 150. The second calibration pattern 150 having a second group of pattern elements 151 may be selected or chosen to aid in further refining a feature of the projection surface 161. Further, the second calibration pattern 150 may be chosen based on image feedback provided by the cameras 120a, 120b. That is, calibration of a projector or projection system may be based on projection of more than one calibration pattern 150 in an adaptive manner.

As described above with respect to FIGS. 4A-4I, the configuration of the calibration pattern 150 may be varied as desired, and, in some embodiments, may be tailored to the geometry or other characteristics of the scene 160, including the surface and topography of the projection surface 161. In other words, the selection of the arrangement of the elements 151 within the pattern 150 and the projection sequence of the pattern 150 may be determined based on the desired projection surface 161.

As the calibration pattern 150 is projected onto the scene in operation 501, the method proceeds to operation 502. In operation 502, the cameras 120a, 120b capture calibration images of the projected calibration pattern 150. As discussed above, the geometric position of the cameras 120a, 120b within the scene 160 is known, i.e., the location and orientation of the cameras 120a, 120b relative to each other and to other objects is known. The cameras 120a, 120b may be adjusted prior to use so that the camera shutters are able to capture the pattern elements 151 without oversaturating the image sensor photoreceptors. This adjustment may be done automatically or manually by a user (e.g., by adjusting the exposure settings).

Figure 4A:
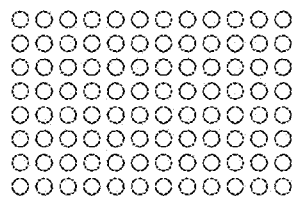
FIGS. 4A-4I illustrate various examples of calibration patterns for use in calibrating the projection system of FIG. 1.
Figure 4B:
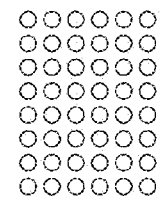
Figure 4C:
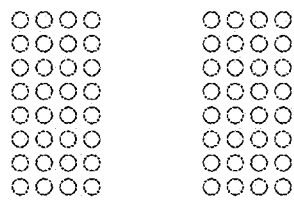
Figure 4D:
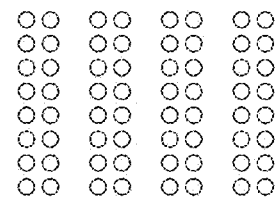
Figure 4E:
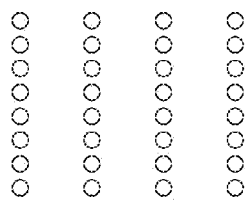
Figure 4F:
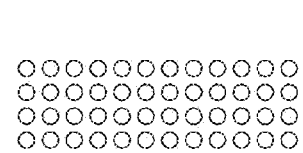
Figure 4G:
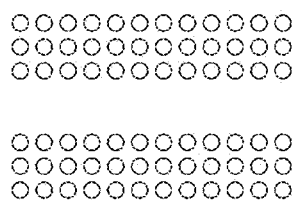
Figure 4H:
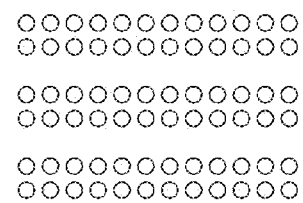
Figure 4I:
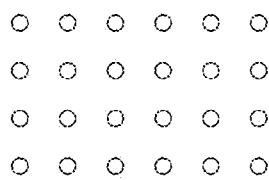
Figure 6:
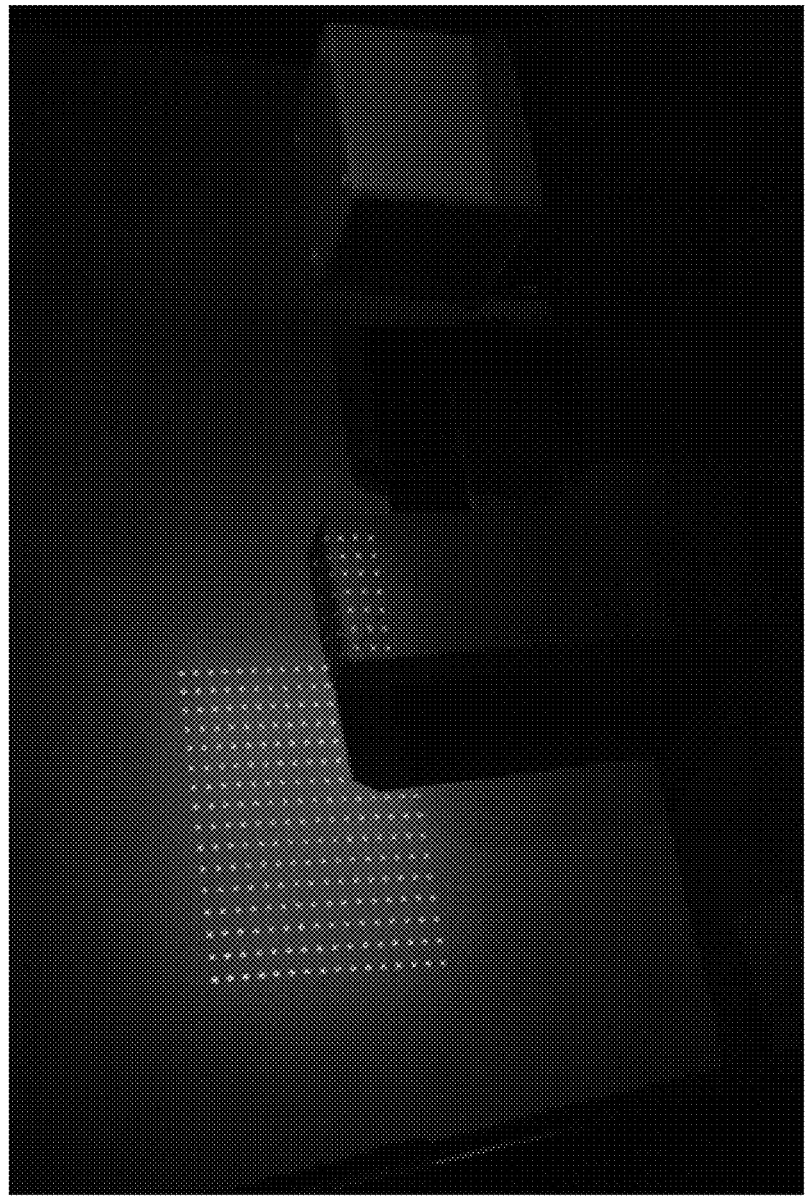
FIG. 6 is an example calibration image of a calibration pattern as projected onto a projection surface.

Using the cameras 120a, 120b, one or more calibration images are captured. FIG. 6 illustrates a calibration image. With reference to FIG. 6, the calibration image 208 may be a photograph, digital image, or the like, that captures the pattern 150 as projected onto the projection surface 161. In the example shown in FIG. 6, the calibration pattern 150 of FIG. 4A is projected onto the surface 161 and captured. Also, as shown in FIG. 6, the pattern elements 151 of the calibration pattern 150 are shown in the calibration image 208, and, as will be explained in more detail below, may be separately identified. In many embodiments, each camera 120a, 120b captures a calibration image 208 and, due to the separation distance $S_D$ and the various positions of the cameras 120a, 120b relative to the scene 160, each of the calibration images 208 captured by each camera 120a, 120b may correspond to the calibration pattern 150 projected onto the projection surface 161 from different perspectives.

In some embodiments, a plurality of calibration patterns may be projected in a predetermined sequence and one or more calibration images 208 for each calibration pattern may be captured. By using multiple patterns, the processing element may be able to more easily determine the distortion of the laser projector, as will be discussed in more detail below.

With reference again to FIG. 5, once the calibration image 208 has been captured, the method 500 proceeds to operation 503. In operation 503, the calibration images 208 are provided to the computer 130, and the processing element 301 analyzes the calibration images 208. In particular, the processing element 301 analyzes the calibration images 208 to detect the pattern elements 151 in each image 208. The processing element 301 detects the location of the pattern elements 151 using an image analysis algorithm, such as a blob detection algorithm, or other algorithm that can detect locations of the pattern elements 151.

The image analysis algorithm used for detecting pattern elements 151 may be selected based on characteristics of the pattern elements 151. For instance if the pattern elements 151 are dots or blobs, the processing element 301 may use a blob detection algorithm. As one example, the blob detection algorithm may include the steps of subtracting a background from an image and thresholding the image in order to mask suspected blob or feature locations. The algorithm may then analyze each masked region to calculate a center of gravity of that blob. In one exemplary embodiment of the present disclosure discussed in more detail below, when the processing element 301 is configured to use a blob detection algorithm to detect pattern elements 151, the processing element 301 may analyze and compare the relative location of the center of gravity for each detected blob to the centers of gravity for other blobs in order to determine the coordinate for the blob within the 2D image plane.

In other embodiments, if the pattern elements 151 are selected to be lines or line segments, a line center detection algorithm may be used. Other algorithms for detecting pattern elements 151 may also or alternatively include feature detection, edge detection, sequential binary coded blobs, binary coded horizontal and/or vertical lines, gray codes with long exposure, color coded patterns, intensity codec patterns, more complex pattern element features, and the like. Depending on the shape of the pattern elements 151, some algorithms may be more accurate than others, while others may require less processing power.

Returning to FIG. 5, once the test pattern has been captured by the camera system 120 and processed by the computer 130, the method 500 proceeds to operation 503. For example, the image analysis algorithm may review the calibration images 208 to detect regions that differ in one or more properties, such as, but not limited to, brightness, color or hue, as compared to surrounding regions. In this example, the pattern elements 151 captured will be brighter and may have a different color than the surrounding areas of the pattern 150, and so allows the processing element 112 to detect their location.

In one example, the processing element 112 may analyze the captured images 208 to determine the location of a center of each pattern element 151 in the 2D image plane of the respective camera 120a, 120b. That is, the 2D coordinates of each pattern element 151 may be determined by using the detectable features of each element 151. In one example, a blob detection algorithm may be used to provide sub-pixel accuracy for the location of the center of a pattern element 151. However, as discussed above, other algorithms may be used as well.

With reference to FIGS. 1 and 5, during operation 503, the processing element 112 of the computer 103 determines the pattern elements 151 that are visible by both cameras 120a, 120b. For example, the processing element 112 may analyze the calibration image 208 of the first cameras 120a to match a unique identifier associated with a particular pattern element 151 (e.g., due to its location, brightness, position in the sequence, color, or other characteristic) and determine if the element 151 having the same identifier is in the calibration image 208 of the second camera 120b.

It should be noted that depending on the location of each camera 120a, 120b and the configuration of the projection surface 161, the number of pattern elements 151 visible by both cameras 120a, 120b, may be a subset of the total number of pattern elements 151 in the calibration pattern 150. That is, some pattern elements 151 may appear in only one calibration image or in neither calibration image 208 due to occlusions related to camera positioning, projector positioning, or specific surface features of project surface 161.

As briefly discussed above, although two cameras 120a, 120b are used to capture the calibration images 208, in other embodiments, additional cameras may be used. Alternatively or additionally, one or more cameras capable of depth perception may be used, such as a 3D stereoscopic camera, KINECT-type depth camera, 3D cameras, or any other type of active or passive depth-detection camera, such as time of flight based 3D cameras or infrared 3D cameras.

Once the pattern elements 151 have been detected in the calibration images 208, the method may proceed to operation 504. In operation 504, the processing element 112 or optionally a user, determines whether a sufficient number of pattern elements 151 have been detected. The sufficient number of detected elements 151 may depend on a desired accuracy for the calibration. In particular, whether the number of detected elements 151 is sufficient to accurately represent the virtual image plane of the laser projector 110, as well as provide enough accuracy to sufficiently trace the geometry of project surface 161.

In operation 504, the sufficient number of detected elements 151 may be determined based on, for instance, a minimum threshold of detected test pattern elements 151. Alternatively or additionally, the determination in operation 504 may be based on the amount of empty areas or occluded areas in the calibration images 208.

If, in operation 504, the number of detected elements 151 is not sufficient, the method may return to operation 501 and project a calibration pattern 150. The calibration pattern 150 may be the same pattern as originally projected or a newly selected calibration pattern 150. For example, the projected calibration pattern 150 may be selected to better eliminate empty and/or occluded areas. If, in operation 504, the number of detected elements 151 is sufficient, the method 500 may proceed to operation 505.

In operation 505, the processing element 112 determines the 3D positions of the test pattern elements 151 within the scene 160. By using the pattern elements 151 visible to at least two cameras 120a, 120b (or at least one depth-perception camera), the location of those test pattern elements 151 on the projection surface 161 can be determined by using triangulation or another location algorithm. For example, in embodiments where two cameras are used, the separation distance $S_D$ between the two cameras 120a, 120b, along with the change in perceived location of the pattern element 151 in the calibration images 208 (e.g. parallax), the processing element 112 determines a distance of the projected pattern element 151 from each camera 120a, 120b. With the location of each camera 120a, 120b and the position of the projected pattern element 151 being known, the 3D position of the pattern element 151, at an impingement location on the projection surface 161 and/or 162, can be determined.

Once the 3D position of at least a subset of pattern elements 151 has been determined, the method proceeds to operation 506. In operation 506, the processing element 112 estimates a perspective projection matrix. In one example, the perspective projection matrix may be created by assuming that the projection of the laser projector 110 approximates a pinhole device. As the laser projector 110 is not a pinhole device and does not have a lens system that approximates a pinhole device, the perspective projection matrix estimated in this operation 506 may need to be further corrected, but provides an initial calibration for the laser projector 110.

To create the perspective projection matrix, the known inputs, such as the predefined and/or preselected structure of the calibration pattern 150 and the detected projected locations of each element 151 within the pattern 150, are used to map the 3D projected pattern. In particular, the 2D location of each pattern element 151 on the virtual image plane of the laser projector 110 is mapped to the 3D projected location on the projection surface 161. In other words, the 2D to 3D correspondences are established and are used to generate a perspective projection matrix using standard methods, such as direct linear transformation. Examples of creating a perspective projection matrix may be found in the book "Multiple View Geometry in Computer Vision", $2^{nd}$ edition, by R. I. Hartley and A. Zisserman, which is incorporated herein by reference in its entirety.

Once the estimated perspective projection matrix has been determined in operation 506, the method proceeds to operation 507. In operation 507, a distortion map, such as a lookup table, for the laser projector 110 is created. As discussed above, due to the mirror assembly 201 of the laser projector 110, the distortion exhibited by the laser projector 110 generally will not accurately conform to the standard lens distortion model based on a pinhole device (e.g. a radial distortion model) that may be applied to account for the non-linearities of lens based imaging systems. In particular, this approximation accounts for distortion of a video projector with an optical projection lens. Thus, the perspective projection matrix estimated in operation 506 (based on the standard lens distortion model) does not take into account the full distortion properties of the laser projector 110 and the estimated perspective projection matrix, and the actual location of pattern elements projected into the scene 160 by the laser projector 110 will be misaligned. Depending on the desired accuracy required for the laser projector 110, the perspective projection matrix may be sufficient. However, in many instances, a more accurate calibration may be required and so a distortion map, which in some embodiments may be a lookup table, may be created.

Figure 7:
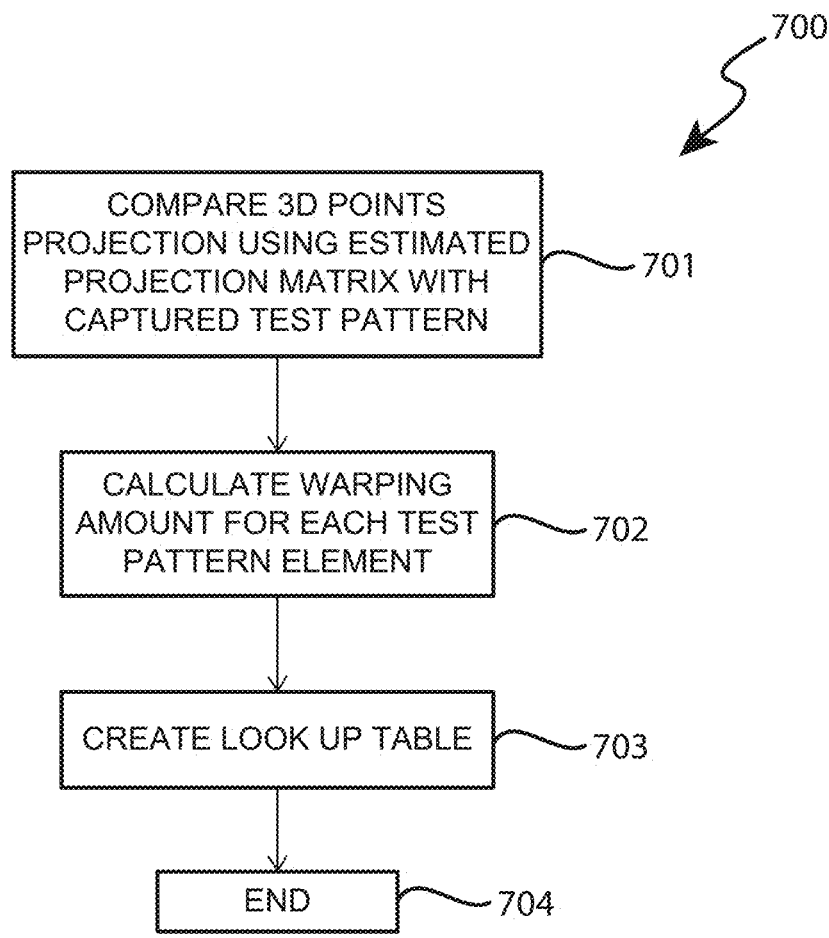
FIG. 7 is a flow chart illustrating a method for creating a distortion map for calibrating the laser projector.

In operation 507, the perspective projection matrix generated in operation 506 may be used as an initial estimation of the distortion by the laser projector 110 to generate a distortion map. FIG. 7 is a flow chart illustrating operation 507. With reference to FIG. 7, operation 507 may begin with process 701. In process 701, the estimated projection matrix is compared by the processing element 301 to the captured calibration image 208 to determine the deviation between the estimated position of pattern elements 151 and the actual position of the pattern elements 151. By way of example, if the laser projector 110 projects a pattern element 151 at a coordinate (1,1) on the virtual image plane, the distortion due to the mirror assembly 201 (and other inherent features of the projector) may cause that pattern element 151 to impinge on the projection surface 161 at an "actual" or "perceived" coordinate of (1.5, 0.5). In operation 701, the deviation between the estimated perspective projection matrix (i.e., the estimated projection location of the pattern element 151) and the actual projection location of the pattern element 151 may be determined. Process 701 may be performed for each detected pattern element 151.

Once the perspective projection matrix has been compared to the captured calibration image(s) 208, operation 507 may proceed to process 702. In process 702, the processor element 301 calculates the warping required to map each detected pattern element 151 in the estimated projection matrix onto the intended projection location of the virtual image plane of the laser projector 110. That is, the amount of distortion needed to be applied to an input image so that pattern element 151 impinges the projection surface 161 at the desired location. When the amount of warping for each pattern element 151 is determined, the method 700 proceeds to create a look up table in operation 703. The look up table may include distortion amounts for those pattern elements 151 detected by the cameras 120a, 120b. To more accurately map the distortion of laser projector 110, an interpolation method may be performed. In particular, the processing element 301 may interpolate additional points for the lookup table using the detected pattern elements 151 to estimate the distortion characteristics for points between the projected pattern elements.

A variety of interpolation algorithms may be utilized, and the interpolation performed may be chosen based on a number of variables, including the number of pattern elements 151 detected, the structure or characteristics of the test pattern 150, or the geometry of the projection surface 161, processing resources, or the like. In some embodiments, a spline-based, locally-varying interpolation method is used to create additional entries for the look up table for points between the detected test pattern elements 151. Furthermore, the look up table may be a simple lookup table, a color map, or other type of lookup table.

Figure 8A:
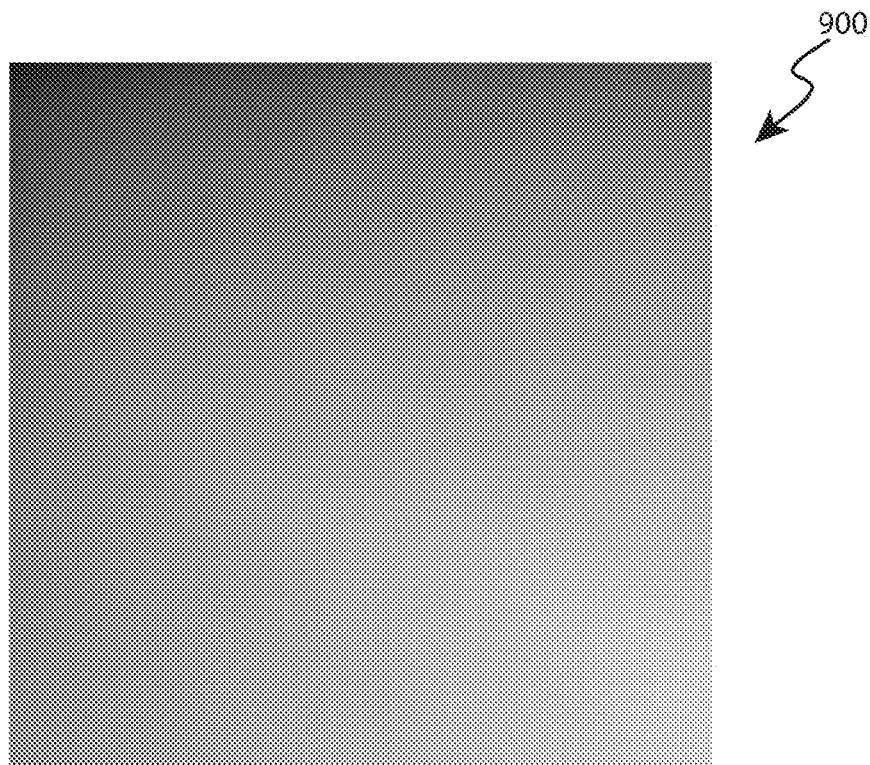
FIG. 8A is an example of a distortion map created using the method of FIG. 7.

FIG. 8A illustrates one example of a lookup table in the form of a distortion map. As shown in FIG. 8A, the distortion map 900 may contain entries assigned or corresponding to pixel locations within the image plane of the laser projector 110. The color assigned to an entry of the map 900 may represent an amount of correction or warping to be applied at that pixel location to correct distortion due to the laser projector 110. That is, normalized x and y coordinates of the image plane may be assigned a particular shade, hue, or intensity of color which can be interpreted by the processing element 301 to determine a correction amount. In one embodiment, when the look up table is created in process 703 of operation 507, the processing element 301 may store the warped or corrected x and y positions in the red and green color channels. In other embodiments, an entry within the distortion map 900 may not only correspond to the warping amount, but also to the warping direction. It is noted that the distortion map 900 is provided as one example of a lookup table created in operation 604, and other types of lookup tables may be used.

Having created the lookup table in operation 703, process 507 terminates. With reference to FIG. 5, upon completion of operation 507, method 500 may proceed to operation 508.

In operation 508, the lookup table, e.g., the color map 900, may be used to create a calibrated accent image from a desired input image. Specifically, the image data is translated or warped to account for distortion that will occur when the image is projected by the laser projector 110.

It should be noted that although the lookup table and projection matrix have been discussed as being calculated in separate operations, in some embodiments the lookup table and the projection matrix may be determined in a single operation. For example, the projection matrix may be constrained to one or more predetermined properties such as a specific field of view, aspect ratio, or the like. By constraining the matrix, the lookup table and the projection matrix may be calculated substantially simultaneously in the same operation.

In one example, in operation 508, the lookup table created in process 604 is used to translate coordinates of the laser projector 110 virtual image plane, such that an image including an image data element (e.g., pixel or group of pixels), projected by the laser projector 110 will impinge the projection surface 161 in the desired location.

Figure 8B:
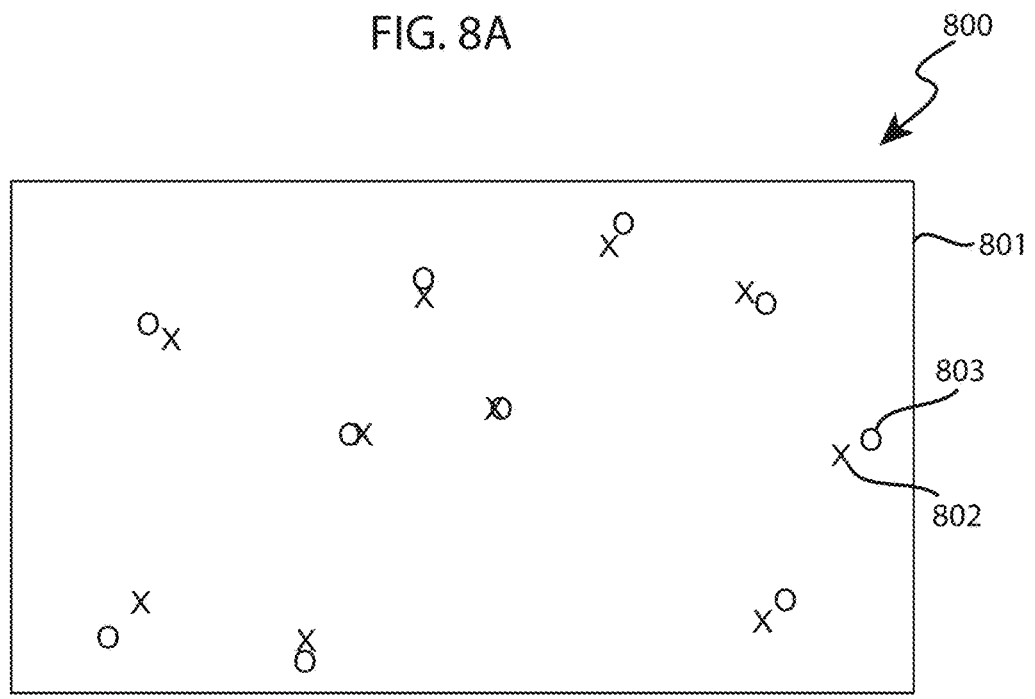
FIG. 8B is an example of calibration test pattern elements before and after calibration of the projector of FIG. 1.

FIG. 8B is an illustration of the translation from operation 508 using the map 900. With reference to FIG. 8B, un-calibrated positions 802 based on the perspective projection matrix are overlaid with translated, calibrated positions 803 of the pattern elements 151. As shown in FIG. 8B, the distortion exhibited by the laser projector 110 may vary widely across the virtual image plane of the laser projector. The position change between calibrated pattern elements 803, represented by an "O," and calibrated pattern elements 802, represented by an "X," are a result of the non-linear translation performed in operation 508 as discussed above. In many embodiments, the calibrated pattern elements 802 may align with the desired positions of the calibration pattern elements prior to projection by the un-calibrated projector 100.

With reference again to FIG. 5, after the accent input image has been translated in operation 508 to form the calibrated accent image, the method 500 proceeds to operation 509. In operation 509, the processing element 112 may transmit the calibrated accent image data to the laser projector 110. Alternatively or additionally, the processing element 112 may store the translated image in the memory 114 or may transmit the translated image to another computing device. After operation 509, the method proceeds to an end state 510.

Figure 9:
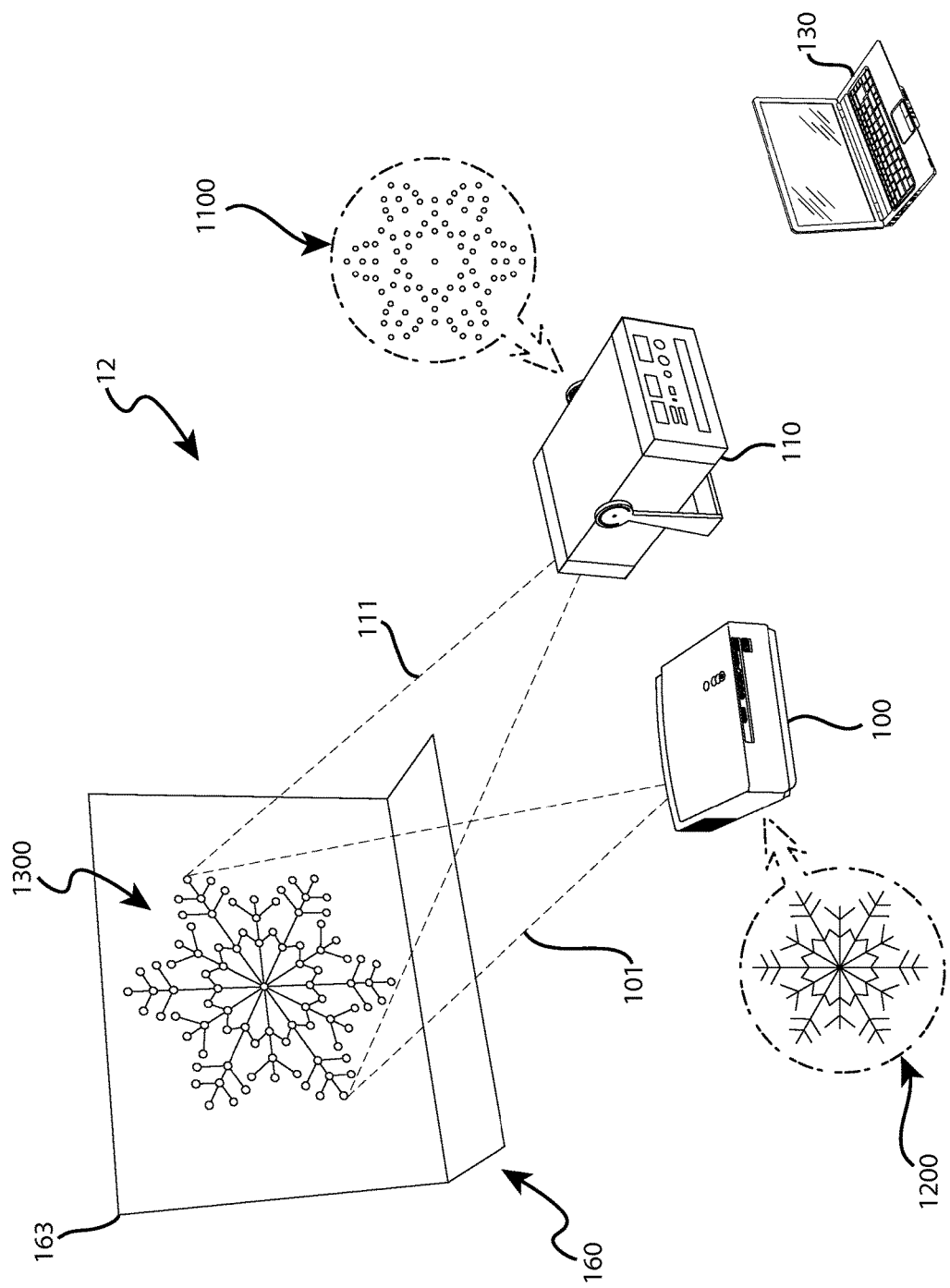
FIG. 9 is an isometric view of an exemplary projection system using the calibrated laser projector.

A system for using the calibrated laser projector 110 for providing accenting images that align with features on the projection surface 161 and/or another projected image will now be discussed in more detail. FIG. 9 is a perspective view of a presentation system 12. The presentation system 12 includes a video projector 100 and one or more laser projectors 110. The presentation system 12 projects one or more images onto a scene 160, the scene 160 may include any number of objects and may be substantially any shape, such as a 3D shape, surface, or the like. As described above with respect to FIG. 1, the projection surface and/or scene may include a projection surface with a vary topography, different colors, textures or the like. It should be understood that the presentation system 12 may be used indoors or outdoors.

The video projector 100 may be positioned at substantially any location relative to the scene 160, but typically is positioned so that it is oriented to face the projection surface 163. The video projector 100 is configured to project one or more images, such as pictures and/or videos onto the projection surface 163.

The video projector 100 has a field of view 101 defining the projection area for the video projector 100. It is noted that the video projector 100 of the presentation system 12 may be rasterization-based video projectors capable of displaying a red, green, and blue (RGB) or another color space image signal. However, monochromatic projectors may optionally be used. The video projector 100 typically will contain a light source and lens. The light source may be any type of light emitting element, such as, but not limited to, one or more light emitting diodes (LED), incandescent bulbs, halogen lights, or the like. The lens is in optical communication with the light source and transmits light from the source to a desired destination, in this case, the projection surface 163. The lens varies one more parameters to affect the light, such as focusing the light at a particular distance. The video projector 100 may also include a white balance adjustment or other color balance feature that can be adjusted automatically and/or manually. This allows the white point of the projector to be applied so as to avoid color shifts that are visible by a human observer.

The laser projector 110 is calibrated using the method of FIG. 5 so that a desired input image may be translated or otherwise modified so that the image elements of the image are projected onto a desired location of the projection scene 160. This allows the projector 110 to align its output image with the image output of the video projector 100 to achieve a highlighting, accentuating, or other augmenting presentation.

Figure 10:
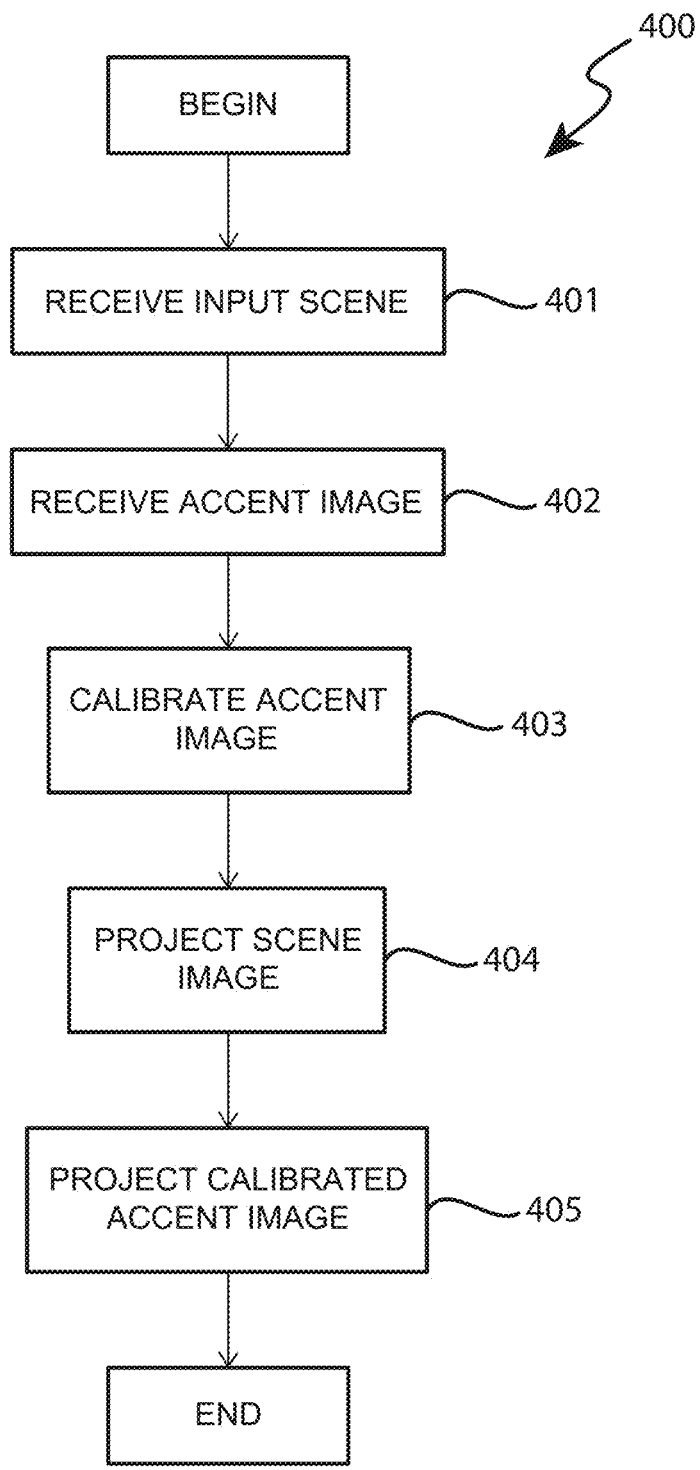
FIG. 10 is a flow chart illustrating the method of projecting images using the system of FIG. 9.

With reference now to FIG. 10 a presentation method 400 using the presentation system 12 will now be discussed. The method begins at operation 401 and the computer 130 receives input video projector image data from a desired source, e.g., other computing device, memory storage component, network, or the like. The input image data may include scene image data, such as texture information, still or moving images, animated images, such as a video sequence, or the like. For example, the scene image data may include characters that virtually "interact" with each other, elements or features within the scene 160, e.g., traverse a portion of the objects forming scene 160. In other words, the scene image data may contain any type of environmental presentation information appropriate for the desired scene.

After operation 401, the method 400 may proceed to operation 402. In operation 402, the processing element 112 of the computer 130 receives an accent image corresponding to an output for the laser projector 110. The accent image may include image data to augment, compliment, or otherwise accent the scene image data for the video projector in predetermined manner. Often, the accent image may include features or characteristics that may not be able to be replicated or produced by the video projector 100, but, due to the unique characteristics and brightness of the laser projector 110, can be projected accurately as desired.

It should be noted that both scene image data and accent image data may be stored together on, for instance, the memory 114 of computer 130 for controlling the presentation system 12. Alternatively, the scene image data may be stored separately from the accent image data, and accessed by the computer 130 separately and transmitted to the appropriate projector.

Once the computer 130 receives the input scene images and accent images, the method 400 may proceed to operation 403. In operation 403, the processing element 112 translates the accent image to account for the distortion of the laser projector 110. For example, using the look up table created in the method 500 of FIG. 5, such as the color map 900 of FIG. 8A, the processing element 112 adjusts the accent image. Accordingly, when the accent image is output by the projector 110, the various image elements, such as each pixel or group of pixels, may be projected onto a desired location on the scene 160. Alternatively or additionally, characteristics of the laser projector 110 may be adjusted based on the lookup table to compensate for the distortion. In this example, the accent image may not need to be modified as the laser projector 110 itself may be modified. That is, the coordinate system that the laser projector 110 uses to determine projection location may be adjusted or modified to project light at the corrected accent image position as determined above.

Once the accent image or the laser projector 110 has been modified, the method 400 may proceed to operation 404. In operation 404, the video projector 100 projects the scene image data onto the scene 160. For example, with reference to FIG. 9, the scene image data 1200 may be provided to the video projector 100 by the computing device 130 or other device, and the video projector 100 outputs light corresponding to the desired scene images.

With reference again to FIG. 7, as the scene image is being projected, the method 400 may proceed to operation 405. In operation 405, the laser projector 110 projects the translated or modified accent image onto the scene 160. Due to the calibration of the laser projector 110 and/or the modification of the accent image 1100, the features of the accent image projected by the laser projector 110 may be projected onto a location within the scene 160 which corresponds to features of the scene image data projected by the projector 100.

With reference to FIG. 9, the dual projection of the video projected image 1200 and the laser-projected image 1100 thus allows the accent image to augment the projected image of the video projector to create a combination image 1300. As one example, the scene image data may include a character, such as a fairy, and the accent image may be used to highlight or accentuate the trail of fairy dust following the fairy by applying a sparkling or shining effect.

Figure 11A:
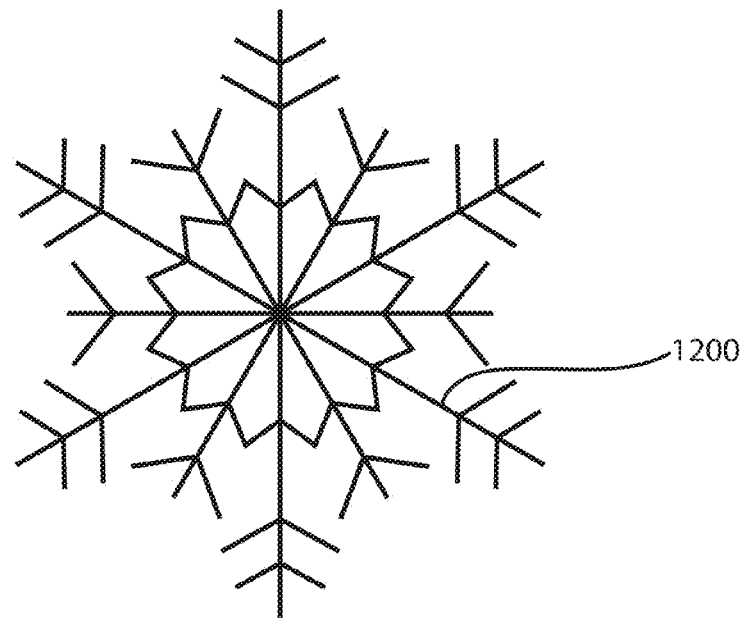
FIG. 11A is an enlarged image of a background or scene image prior to the accenting image being projected onto the scene image.
Figure 11B:
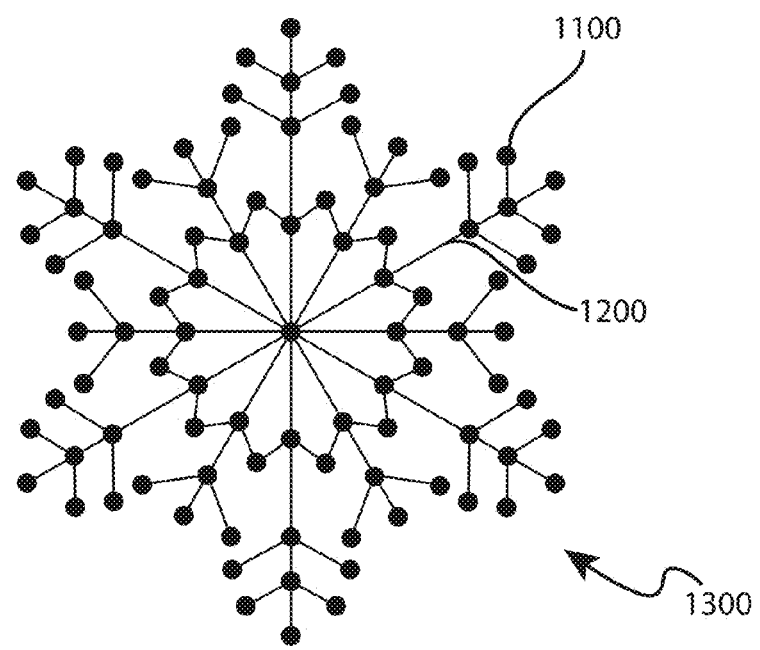
FIG. 11B is an enlarged image of the scene image of FIG. 11A with an accenting image overlaid over the top thereof.

FIG. 11A is an enlarged image of a scene image and FIG. 11B is an enlarged image of the scene image of FIG. 11A with an accent image projected therewith. With reference to FIGS. 9, 11A and 11B, the scene image 1200 is projected by the video projector and may not include high frequency details, such as very bright or sparkly spots, or the like. However, in FIG. 11B, once the accent image 1100 is projected by the laser projector 110, the combined image 1300 may include both the overall details of the scene image 1200 along with the augmented portions of the accent image 1100. The accent image 1100 provides a bright hue, different color, or other characteristic that cannot be accomplished by the video projector.

In one example, the accent image 1100 is configured to be projected so as to be overlaid on the scene image 1200 projected by the video projector(s) 100. Alternatively, the two images may be otherwise projected together. The scene image 1200 may represent scene geometry, a character, a background scene or like. As can be seen in FIG. 11B, once the calibration of the projection system according to the present disclosure has been performed, scene image data projected by the video projector 100 overlays and aligns with the accent image data projected by the laser projector 110. And the accent image blends with the scene image to create a desired artistic presentation. The alignment between the scene image and the accent image is possible as the accent image 1110 is modified using the distortion map 900 to account for the distortion. Alternatively or additionally, the laser projector 110, rather than an input image for the accent image, can be calibrated to correct for such distortion.

In some embodiments, the fields of view (FOVs) of the laser projector and video projector substantially overlap. In other embodiments, the FOVs of the laser projector and the video projector only partially overlap, wherein non-overlapping portions of the FOV of the respective projector may overlap with the FOV of another projector provided in the projection system, such as a second video projector oriented toward a different portion of the scene, or oriented at a different perspective angle or elevation within the scene 160.

The above specification, examples, and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A method of calibrating a projector comprising: receiving by a processing element a first calibration image of a first calibration pattern comprising a plurality of pattern elements projected onto a projection surface; detecting by the processing element the plurality of pattern elements in the first calibration image by an image analysis algorithm; generating a perspective projection matrix by the processing element by modeling the projector as a pinhole device with a pinhole approximation to provide a first calibration approximation based on the detected pattern elements in the first calibration image and the first calibration pattern; and determining by the processing element a two-dimensional non-linear mapping function to correct inaccuracies in the first calibration approximation resulting from the pinhole approximation by analyzing the first calibration image to compensate for distortion characteristics inherent to the projector, wherein the non-linear mapping function is determined by comparing by the processing element the first calibration image and the perspective projection matrix.

2. The method of claim 1, further comprising determining by the processing element a three-dimensional position of the plurality of pattern elements.

3. The method of claim 1, further comprising generating by the processing element a calibrated image by transforming the first calibration image using the non-linear mapping function.

4. The method of claim 1, further comprising determining by the processing element a transformation amount for each of the pluralities of pattern elements.

5. The method of claim 1, further comprising creating by the processing element a look up table using the non-linear mapping function.

6. The method of claim 5, further comprising interpolating by the processing element values within the look up table to increase the number of values.

7. The method of claim 1, further comprising:
receiving by the processing element a second calibration image of a second calibration pattern projected onto a projection surface, wherein the second calibration pattern is different than the first calibration pattern.

8. The method of claim 7, wherein generation of the perspective projection matrix further comprises analyzing the second calibration image and the second calibration pattern.

9. The method of claim 1, further comprising:
modifying by the processing element an input image based on the two-dimensional non-linear mapping function to generate a modified input image, wherein the modified input image accounts for distortion that will occur when the input image is projected by the projector; and
transmitting the modified input image to the projector for projection on the display surface.

* * * * *